(12) United States Patent
Skillman

(10) Patent No.: US 10,648,283 B1
(45) Date of Patent: May 12, 2020

(54) TOP OPEN CAGE

(71) Applicant: Milt Skillman, Mount Vernon, TX (US)

(72) Inventor: Milt Skillman, Mount Vernon, TX (US)

(*) Notice: Subject to any disclaimer, the term of this patent is extended or adjusted under 35 U.S.C. 154(b) by 0 days.

(21) Appl. No.: 16/199,439

(22) Filed: Nov. 26, 2018

(51) Int. Cl.
| | |
|---|---|
| *F16K 15/04* | (2006.01) |
| *E21B 34/08* | (2006.01) |
| *F04B 47/00* | (2006.01) |
| *F16K 27/02* | (2006.01) |
| *F16K 15/18* | (2006.01) |
| *E21B 34/00* | (2006.01) |

(52) U.S. Cl.
CPC .............. *E21B 34/08* (2013.01); *F04B 47/00* (2013.01); *F16K 15/183* (2013.01); *F16K 27/0245* (2013.01); *E21B 2034/002* (2013.01)

(58) Field of Classification Search
CPC ........ E21B 34/08; F16K 15/183; F16K 15/04; Y10T 137/7873

USPC ................................................... 137/533.11
See application file for complete search history.

(56) References Cited

U.S. PATENT DOCUMENTS 4,452,306 A * 6/1984 Polley ................. E21B 47/1025
                                                     137/533.11

* cited by examiner

*Primary Examiner* — P. Macade Nichols
(74) *Attorney, Agent, or Firm* — Dentons US LLP

(57) ABSTRACT

A top open cage may include a first outer diameter at a bottom portion, a second outer diameter smaller than the first outer diameter at a middle portion, a third outer diameter smaller than the second outer diameter at a top portion, a chamber internal to the bottom portion and at least a portion of the middle portion, a first set of inlets from an outer surface of the middle portion to a middle section of the chamber, and a second set of inlets from an outer surface of the middle portion to the top end of the chamber. The chamber may be defined by a first inner diameter at a bottom end of the chamber and a second inner diameter smaller than the first inner diameter at a top end of the chamber.

11 Claims, 6 Drawing Sheets

600

600

TOP OPEN CAGE

FIELD OF THE INVENTION

The present invention relates to travelling valves, and more specifically, to travelling valves of down hole pumps.

BACKGROUND OF THE INVENTION

Down hole pumps are used for extracting various resources including oil and gas. There are many different types of down hole pumps with strengths and weaknesses found in each design. Some of these pump designs include rod pumps and tubing pumps. A cage at the top of the tube or plunger is used to actuate so that fluid may be extracted every cycle.

One such cage is referred to as a top open cage. The top open cage includes large slots running down the side of the cage so that the resource can flow through the cage to a collector up stream. However, these large slots compromise the structure of the cage and may result in breaking the cage. These failures create a financial and time intensive burden on the operator of the pump. The top open cage is also extremely difficult to extract from the down hole when the structure of the cage has been compromised, creating additional hardships for the operator.

Internal to the cage is a ball and seat. The ball is pushed to the top of an internal portion of the cage by the flow of the resource on the downstroke, or alternatively falls to the seat on the up stroke and is held in place by the hydrostatic pressure of the tubing, thus blocking any further flow through the cage. As the pump travels in each direction, the ball is transitioned between the two states. However, with the large side slots, the ball receives many opposing forces and spins and bounces as it travels, resulting in a loss of efficiency.

Lastly, the ball does not set smoothly at the top of the inside of the cage because the top is a flat surface and the ball continues to move and disrupt the flow of resources. A solution to improve efficiency and increase structural integrity is required to maximize extraction of resources for every stroke of the pump.

BRIEF SUMMARY OF THE INVENTION

One embodiment of a top open cage may include a first outer diameter at a bottom portion of the top open cage, a second outer diameter smaller than the first outer diameter at a middle portion of the top open cage, a third outer diameter smaller than the second outer diameter at a top portion of the top open cage, a chamber internal to the bottom portion and at least a portion of the middle portion, a first set of inlets from an outer surface of the middle portion to a middle section of the chamber, and a second set of inlets from an outer surface of the middle portion to the top end of the chamber. The middle portion may be adjacent to the bottom portion. The top portion may be adjacent to the middle portion and opposite the bottom portion. The chamber may be defined by a first inner diameter at a bottom end of the chamber and a second inner diameter smaller than the first inner diameter at a top end of the chamber. The bottom end of the chamber may be internal to the bottom portion of the top open cage and the top end of the chamber may be internal to the middle portion of the top open cage.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
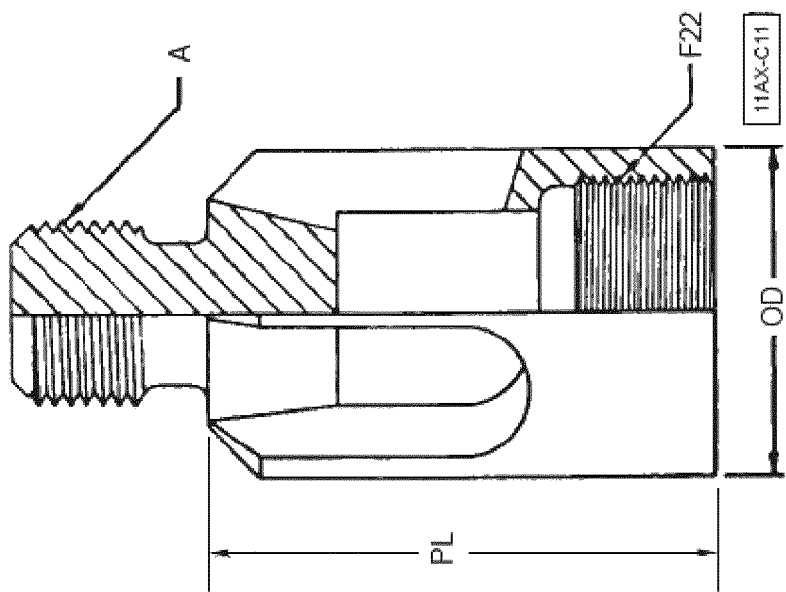
FIG. 1 is an illustration of a prior art top open cage.

With regard to FIG. 1, a prior art top open cage is discussed further. The cage has a large diameter below the sucker rod pin and is larger than the sucker rod coupling. If the pin breaks it is unlikely that it can retrieved and/or replaced. This means the tubing must be pulled at great cost to the operator in order to repair the pump.

The cage includes long slots cut into a cage body to allow fluid flow, which weakens the structure of the cage. The slots are also highly restrictive to fluid flow. It doesn't matter how long the slots are, only how wide they are matters. This cage is run inside a pump barrel or tubing which is round so a top view of the cage is the area of flow. There is a compromise of wider slots for more flow, however this comes with less cage strength. Wider guides for greater strength results in less fluid flow.

Ball guides do not control the movement of the ball and the ball spins and bounces around on the guides as fluid passes around the ball through the cage. This in turn starts displacing metal on the guides as the ball hits them repeatedly, damaging the cage and the ball. Manufactures have hard lined the guides and made hardened inserts to protect the cage. This can help extend the life of the cage but shortens the life of the ball and seat. It also adds more cost to the user by adding more costly steps to the manufacturing process and the need for multiple parts to make one cage.

Figure 2:
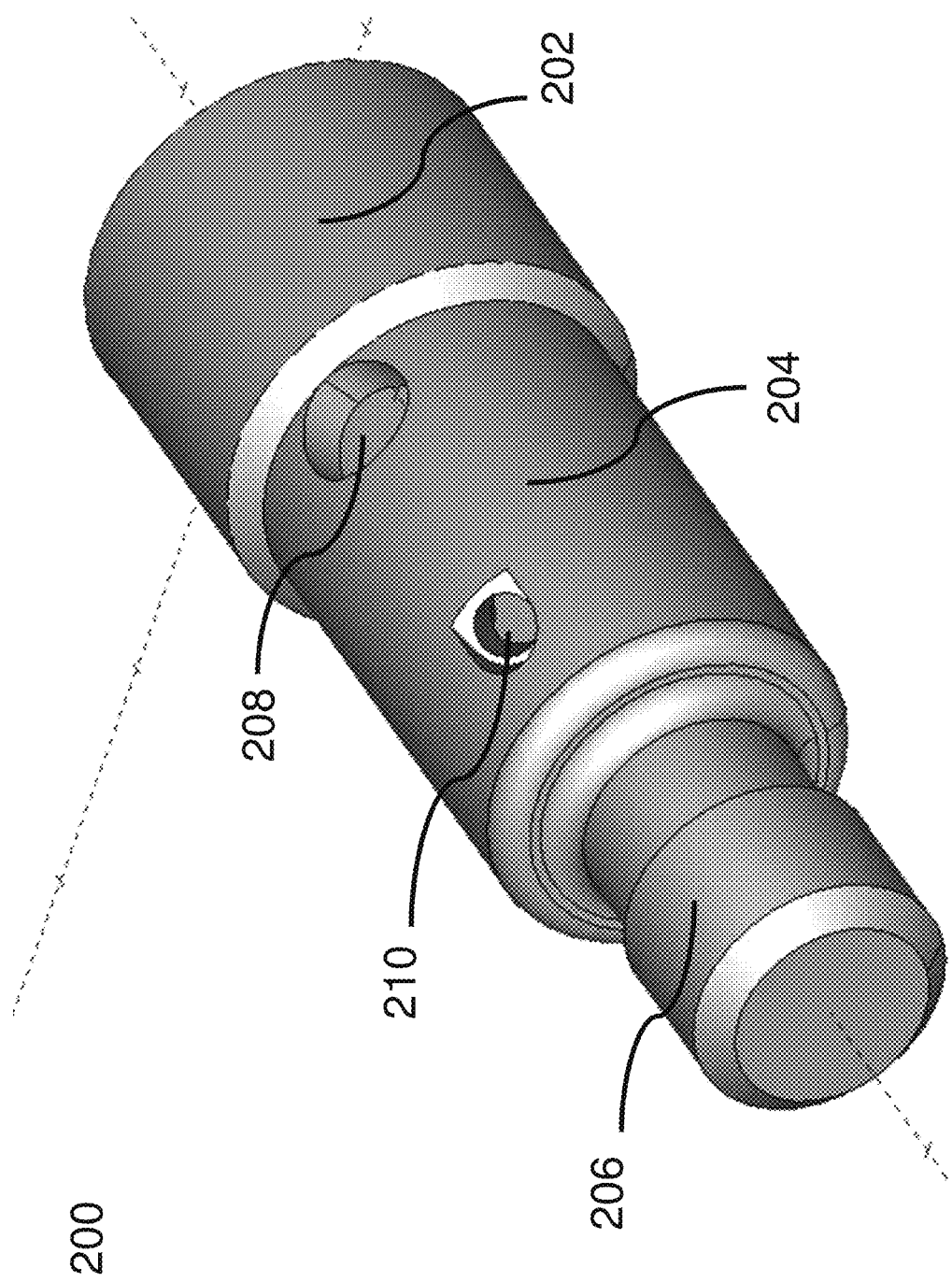
FIG. 2 is an illustration of an illustrative drawing of a top open cage.

The top of the inside of the cage is flat and the ball is round. When the ball and seat valve open, the ball rises causing one point of the round ball to contact one point of the flat surface. This can damage the ball effecting its sealing ability. In a fluid pound condition the force can be tremendous. Fluid pound is caused when the pump barrel is just partially filled with fluid. This happens when the pump is pumping faster than the formation is giving up fluid or when both gas and fluid enter the pump barrel on an up stroke. On a down stroke, fluid in a tubing (hydrostatic pressure) is holding the traveling valve shut as it travels through the gas in the upper part of the barrel. When it hits the fluid in the lower part of the barrel the ball shoots to the top of the cage with great force causing damage to the ball and the cage With regard to FIG. 2, a top open cage 200 is discussed further. The top open cage 200 may comprise a bottom portion 202, a middle portion 204, and a top portion 206. The top open cage 200 may further comprise a first set of inlets 208 and a second set of inlets 210.

The middle portion 204 may be configured to be adjacent to the bottom portion 202. The top portion 206 may be configured to be adjacent to the middle portion 204 and opposite the bottom portion 202. The bottom portion 202 may have an internal wall that comprises at least a portion of an internal surface that is threaded. The top portion 206 may comprise at least a portion of an outer surface that is threaded.

The first set of inlets 208 may comprise three inlets around a circumference of a lower part of the middle portion 204. The first set of inlets 208 may be configured to substantially perpendicular to an outer surface of the middle portion 204. The second set of inlets 210 may comprise three inlets. The second set of inlets 210 may be configured to angle from an upper part of the middle portion 204 on the outer surface to a middle part of the middle portion 204 on an inner surface so that the second set of inlets 210 are at an angle from the outer surface of the middle portion 204. The first set of inlets 208 may comprise a diameter sufficient to allow an unrestricted flow of a resource.

In one embodiment, to achieve an unrestricted flow of the resource, a cage flow area both through the top open cage 200 and around the top open cage 200 may substantially never meet and/or exceed a flow area of an inner diameter of a seat of a ball and seat valve located in a chamber of the top open cage 200.

By using the first set of inlets 208 and the second set of inlets 210 for fluid flow, which may also be smaller in diameter than the wide slots of the prior art top open cage of FIG. 1, more fluid flow area and better cage structural integrity or strength may be achieved. By increasing the flow area of the cage, there may be less compression of a rod string of a pump comprising the top open cage 200 therefor less rod buckling which may rub holes in the tubing. As a result, by removing compression in the rod string on a down stroke of the pump, there is more stroke length or plunger travel in the pump. This in turn makes for a stronger and more efficient pump. The pump may see more production with the same strokes per minute.

In one embodiment, the first set of inlets 208 have a diameter of approximately 0.5 inches, the second set of inlets 210 have a diameter of approximately 0.25 inches, and the second set of inlets 210 are approximately at a 45 degree angle with the outer surface of the middle portion 204.

Figure 3:
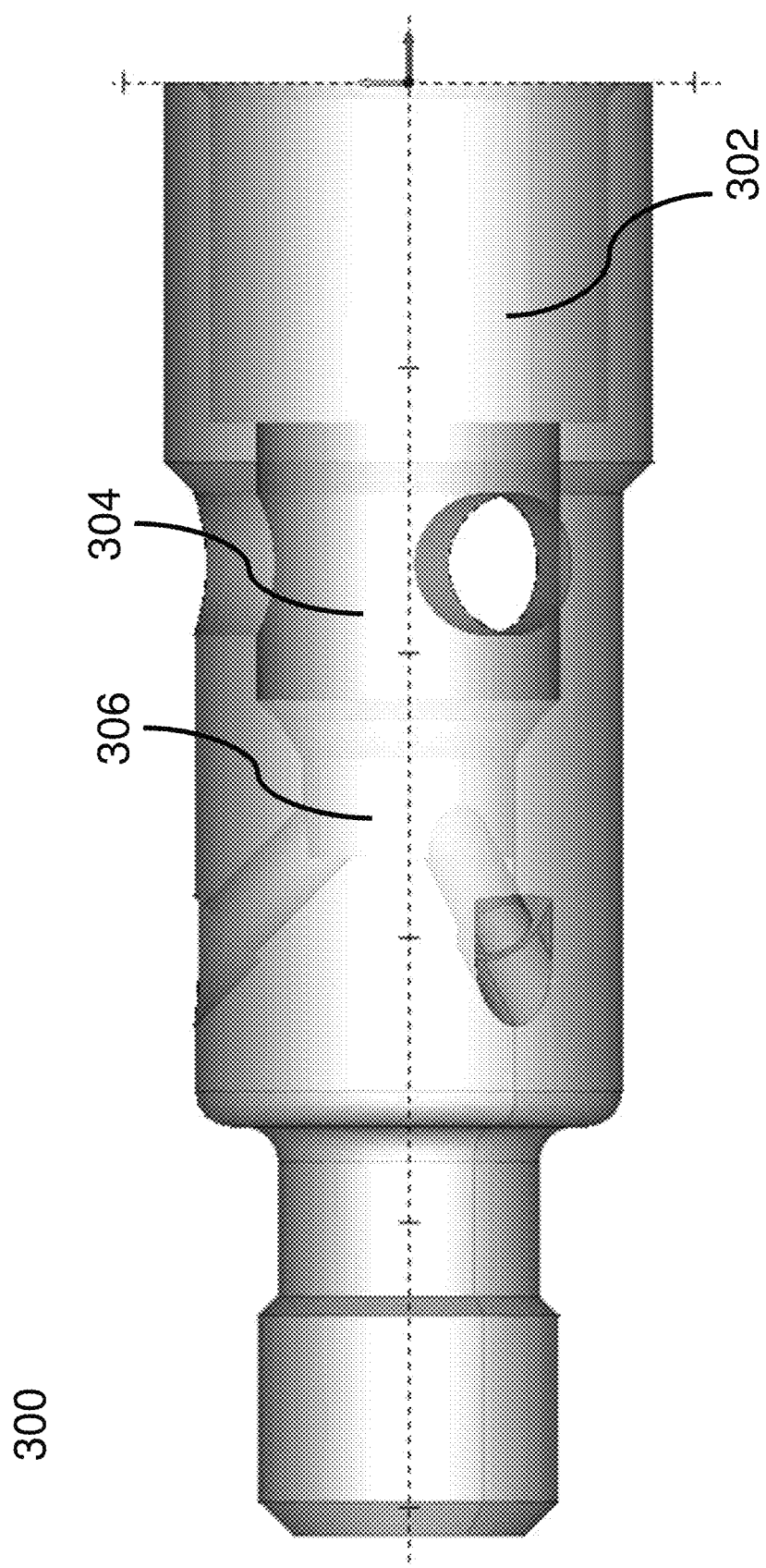
FIG. 3 is an illustration of an illustrative translucent drawing of a top open cage.

With regard to FIG. 3, a top open cage 300 is discussed further. The top open cage 300 may be the top open cage 200 of FIG. 2. The top open cage 300 may comprise a chamber internal to the bottom portion 202 and at least a portion of the middle portion 204. The chamber may comprise a bottom end 302, a middle section 304, and a top end 306.

The chamber may be configured to house a ball that travels along the chamber between the bottom end 302 and the top end 306 in order to allow the flow of at least a gas, liquid, and/or oil ("resource") past the top open cage 300. In a first state, the ball is in the bottom end 302 of the chamber and no resource may travel past the top open cage 300 in a down hole pump. In a second state, the ball is in the middle end 304 and top end 306 of the chamber and resources may travel past the top open cage 300 in the down hole pump. The first and second states are achieved by actuation the pump, of which the top open cage 300 is a part.

Figure 4:
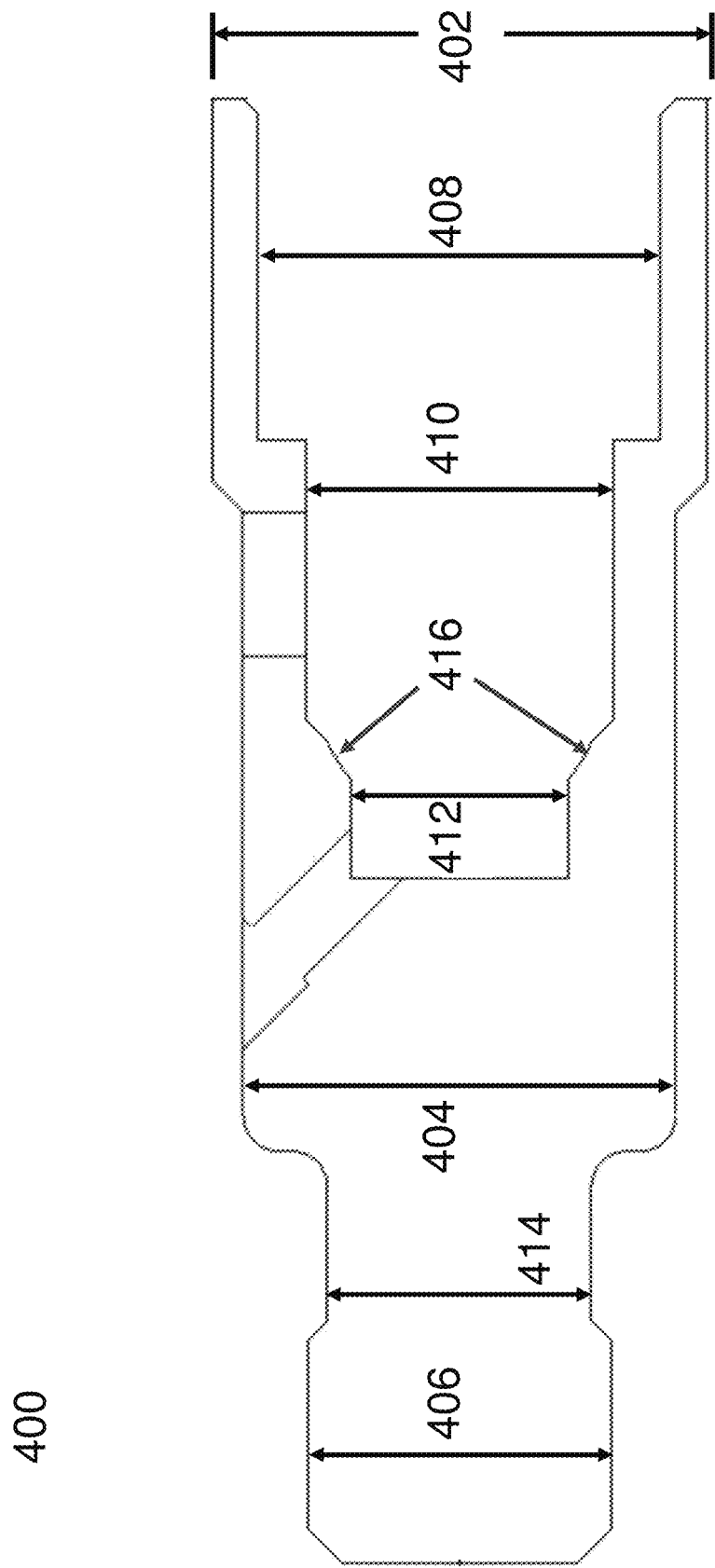
FIGS. 4-6 are illustrations of an illustrative cross-sectional drawing of a top open cage.

With regard to FIG. 4, a top open cage 400 is discussed further. The top open cage 400 may be the top open cage 200 of FIG. 2 and 300 of FIG. 3. The top open cage 400 may comprise a first outer diameter 402, a second outer diameter 404, and a third outer diameter 406 that may be configured to be smaller than the second outer diameter 404. In one embodiment, the second outer diameter 404 may be configured to be smaller than the first outer diameter 402.

The top open cage 400 may further comprise a first inner diameter 408, a second inner diameter 410 that may be configured to be smaller than the first inner diameter 408, and a third inner diameter 412 that may be configured to be smaller than the second inner diameter 410.

In some embodiments, the top open cage 400 may further comprise a fourth outer diameter 414 that may be configured to be smaller than the third outer diameter 406. In some embodiments, the chamber further comprises a wall 416 that comprises a curvature with a radius that may be substantially similar to a radius of a curvature of a ball that is housed within the chamber. The ball may be the ball of FIG. 3.

In one embodiment, the first outer diameter 402 may be approximately 1.75 inches, the second outer diameter 404, may be approximately 1.695 inches, the third outer diameter 406 may be approximately 1.0611 inches, the first inner diameter 408 may be approximately 1.47 inches, and the second inner diameter 410, may be approximately 1.065 inches.

In one embodiment, the second outer diameter 404 being smaller than the first outer diameter 402 may make it possible for the top open cage 400 to be fished or caught with a fishing tool if a sucker rod pin on top of the top open cage 400 breaks. The top open cage 400 may also be made for a smaller valve which would depart from American Petroleum Institute standards but may allow the top open cage 400 to have smaller outer diameters, such as first outer diameter 402, second outer diameter 404, and third outer diameter 404, without a reduced area on the outer diameters form and still have full flow and be fishable.

Figure 5:
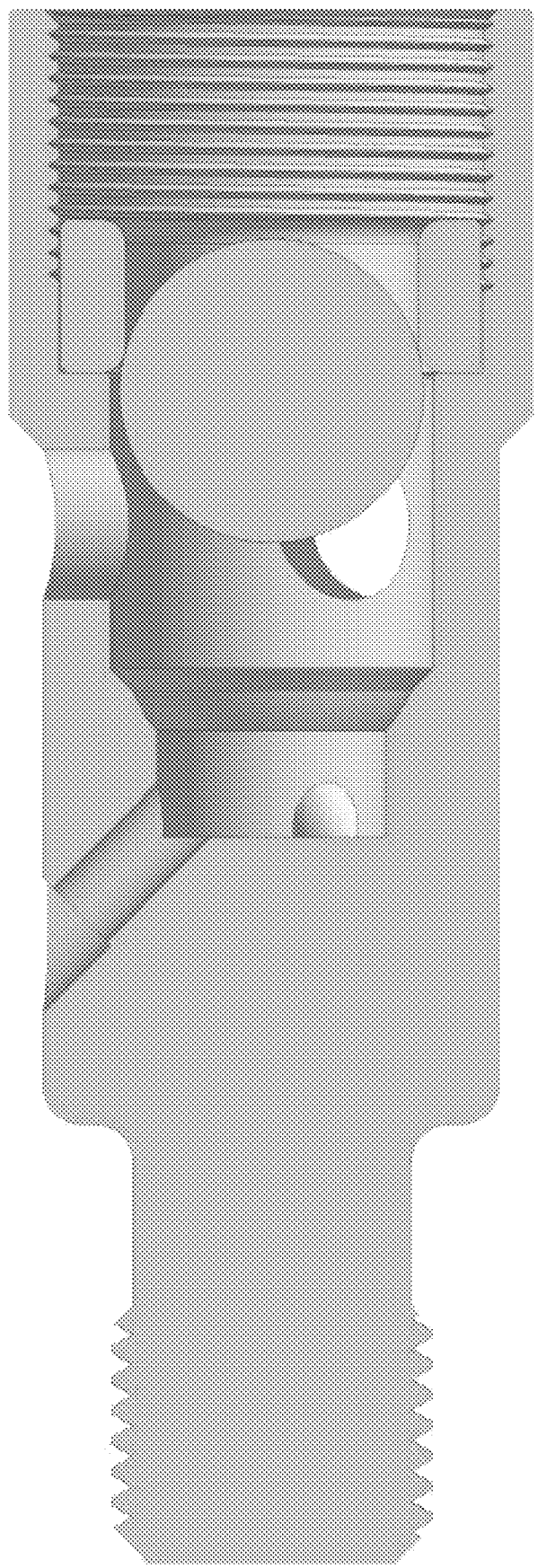
Figure 6:
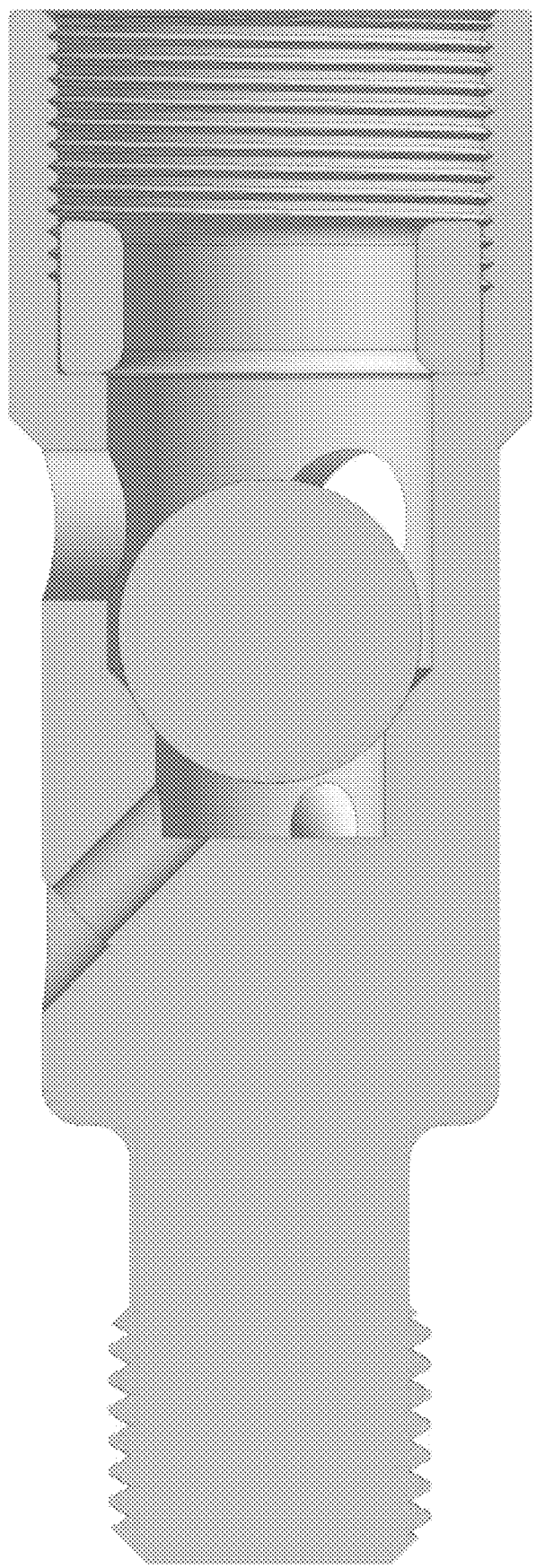

A ball and seat valve which is inside the top open cage 200, 300, 400, which may be used as a traveling valve, may open 500 on the down stroke, as represented in FIG. 5, and close 600 on the up stroke, as represented in FIG. 6. On the up stroke the ball may be sealed on the seat and no fluid is passing through the cage and there is no movement of the ball. On the down stroke, when pressure in the pump chamber (below the ball) equalizes with the hydrostatic pressure of the tubing (above the ball) the ball rises through the chamber of the top open cage 200, 300, 400. When the ball hits the curvature 416, it seals and the fluid exits through the first set of inlets 208 passing by the outside of the top open cage 200, 300, 400 in an upward motion relative to the top open cage 200, 300, 400, into tubing of the pump. To eliminate ball spin and movement, as fluid is passing through the seat and through and around the cage the second set of inlets 210 located above the first set of inlets 208 may be venturi holes. The second set of inlets 210 may be configured to go from the outside of the cage body and are connected to a smaller cylindrical area in the top end 306 of the chamber above the curvature 216 inside the cage. On the down stroke, as pressurized fluid from the pump chamber goes through the seat it pushes against the ball from the bottom end 302 of the camber as it exits the top open cage 200, 300, 400. As fluid flows past the second set of inlets 210 on the outside of the cage a low-pressure area or suction to the top of the ball that is exposed to the smaller upper cylindrical area above the curvature 216 is created in the top end 306 of the chamber. The low pressure may secure that the ball substantially without movement, as fluid is passing through the top open cage 200, 300, 400. On the up stroke the fluid is now moving downward relative to the top open cage 200, 300, 400 cage and the low pressure venturi effect is lost and the pump chamber becomes the low-pressure area. This causes the ball to fall and seal on the seat again. There may be no need for the top open cage 200, 300, 400 to be made of a hardened material or made of multiple parts. By eliminating spin and chatter of the ball both the life of the top open cage 200, 300, 400 and the life of the ball and seat are extended. As the fluid seals are the life of the pump this will save operators expensive pulling cost for pump repairs and reduce the cost of repairs when they are needed.

With this new design when there is fluid pound, the ball rises up, but now instead of one point of the ball hitting one point of the top open cage 200, 300, 400, it contacts its own form in the curvature 216. Energy is distributed around the whole curvature 216 which is the mirror image of the ball. Even with a hard impact it will not damage the ball or displace the material the top open cage 200, 300, 400 is made of.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The previous description is of a preferred embodiment for implementing the invention, and the scope of the invention should not necessarily be limited by this description. The scope of the present invention is instead defined by the following claims.

What is claimed:

1. A top open cage, comprising:
    a first outer diameter at a bottom portion of the top open cage;
    a second outer diameter smaller than the first outer diameter at a middle portion of the top open cage, the middle portion being adjacent to the bottom portion;
    a third outer diameter smaller than the second outer diameter at a top portion of the top open cage, the top portion being adjacent to the middle portion and opposite the bottom portion;
    a chamber internal to the bottom portion and at least a portion of the middle portion, the chamber being defined by a first inner diameter at a bottom end of the chamber and a second inner diameter smaller than the first inner diameter at a top end of the chamber, the bottom end of the chamber being internal to the bottom portion of the top open cage and the top end of the chamber being internal to the middle portion of the top open cage;
    a first set of inlets from an outer surface of the middle portion to a middle section of the chamber; and
    a second set of inlets from an outer surface of the middle portion to the top end of the chamber.

2. The top open cage according to claim 1, wherein the second outer diameter is smaller than the first outer diameter.

3. The top open cage according to claim 1, wherein the chamber is configured to house a ball and wherein the chamber is configured to have a wall with a curvature comprising a radius substantially similar to a radius of a curvature of the ball.

4. The top open cage according to claim 3, wherein a pocket is created in the top end of the chamber when the ball is setting against the curvature of the wall of the top end of the chamber.

5. The top open cage according to claim 4, wherein the second set of inlets are configured to connect into a portion of the top end of the chamber that becomes the pocket.

6. The top open cage according to claim 1, wherein at least a portion of an outer surface of the top portion of the top open cage is threaded and wherein at least a portion of an inner surface of the bottom portion of the top open cage is threaded.

7. The top open cage according to claim 1, wherein the first set of inlets are substantially perpendicular to the outer surface of the middle portion.

8. The top open cage according to claim 7, wherein the first set of inlets comprise 3 inlets.

9. The top open cage according to claim 1, wherein the second set of inlets comprise 3 inlets.

10. The top open cage according to claim 9, wherein the second set of inlets comprise 3 inlets.

11. The top open cage according to claim 1, wherein the chamber is further defined by a third inner diameter smaller than the first inner diameter and bigger than the second inner diameter at the middle section of the chamber.

* * * * *